US011120659B2

(12) United States Patent
Zhao et al.

(10) Patent No.: US 11,120,659 B2
(45) Date of Patent: Sep. 14, 2021

(54) BANKNOTE PROCESSING DEVICE AND BANKNOTE PROCESSING METHOD

(71) Applicant: Shandong New Beiyang Information Technology Co., Ltd., Shandong (CN)

(72) Inventors: Zhenxing Zhao, Shandong (CN); Naisheng Ren, Shandong (CN); Chuntao Wang, Shandong (CN); Bingqing Liu, Shandong (CN)

(73) Assignee: Shandong New Beiyang Information Technology Co., Ltd., Shandong (CN)

( * ) Notice: Subject to any disclaimer, the term of this patent is extended or adjusted under 35 U.S.C. 154(b) by 129 days.

(21) Appl. No.: 16/604,526

(22) PCT Filed: Mar. 20, 2018

(86) PCT No.: PCT/CN2018/079637

§ 371 (c)(1),
(2) Date: Oct. 10, 2019

(87) PCT Pub. No.: WO2018/188455

PCT Pub. Date: Oct. 18, 2018

(65) Prior Publication Data

US 2020/0160644 A1 May 21, 2020

(30) Foreign Application Priority Data

Apr. 11, 2017 (CN) ......................... 201710232461.5

(51) Int. Cl.
*G06Q 40/00* (2012.01)
*G07D 11/00* (2019.01)
(Continued)

(52) U.S. Cl.
CPC ............ *G07D 11/25* (2019.01); *G07D 11/14* (2019.01); *G07D 11/18* (2019.01)

(58) Field of Classification Search
USPC .......................................................... 235/379
See application file for complete search history.

(56) References Cited

U.S. PATENT DOCUMENTS 5,186,334 A * 2/1993 Fukudome ............. G07D 11/40 209/534
6,422,458 B1 * 7/2002 Katou .................... B65H 1/025 235/379

(Continued)

FOREIGN PATENT DOCUMENTS

CN 101727698 A 6/2010
CN 105139513 A 12/2015

(Continued)

OTHER PUBLICATIONS

International Search Report dated Jun. 27, 2018, in the International Application: PCT/CN2018/079637, 4 pages.

(Continued)

*Primary Examiner* — Tuyen K Vo
(74) *Attorney, Agent, or Firm* — Wilmer Cutler Pickering Hale and Dorr LLP

(57) ABSTRACT

Disclosed is a banknote processing device and a banknote processing method. The banknote processing device includes an identification mechanism, an in-out mechanism, a loading box, a circulating box, a main passage, an auxiliary passage, an in-out passage, a loading passage, and a circulating passage. The auxiliary passage is of annular shape, and both ends of the main passage are each connected to the auxiliary passage. A banknote is allowed to move in a one-way direction along a preset direction in the auxiliary passage. The identification mechanism is disposed in the main passage. The in-out passage is connected between the main passage and the in-out mechanism. A first end of the circulating passage is connected to the main passage. A second end of the circulating passage is connected to the (Continued)

circulating box. A first end of the loading passage is connected to the auxiliary passage, and a second end of the loading passage is connected to the loading passage.

18 Claims, 10 Drawing Sheets

(51) Int. Cl.

| | |
|---|---|
| ***G07F 19/00*** | (2006.01) |
| ***G07D 11/25*** | (2019.01) |
| ***G07D 11/18*** | (2019.01) |
| ***G07D 11/14*** | (2019.01) |

(56) References Cited

U.S. PATENT DOCUMENTS

| | | | | |
|---|---|---|---|---|
| 2002/0088850 | A1* | 7/2002 | Katou | B65H 29/006 235/379 |
| 2004/0256450 | A1* | 12/2004 | Fujioka | G07D 11/25 235/379 |
| 2007/0267808 | A1* | 11/2007 | Cha | B65H 1/00 271/273 |
| 2009/0183967 | A1* | 7/2009 | Hamasaki | G07D 11/50 194/320 |
| 2017/0309133 | A1* | 10/2017 | Okamoto | B65H 31/24 |
| 2018/0082509 | A1* | 3/2018 | Fujita | B65H 31/24 |

FOREIGN PATENT DOCUMENTS

| | | | |
|---|---|---|---|
| CN | 106023427 | A | 10/2016 |
| JP | 2000-357257 | A | 12/2000 |
| JP | 2006-120180 | A | 5/2006 |
| JP | 2008-059472 | A | 3/2008 |
| JP | 2017-013906 | A | 1/2017 |
| KR | 20170023497 | A | 3/2017 |

OTHER PUBLICATIONS

European Search Report dated Dec. 11, 2020, in the European Application No. 18784453.5. 12 pages.

* cited by examiner

--Prior Art--

BANKNOTE PROCESSING DEVICE AND BANKNOTE PROCESSING METHOD

CROSS REFERENCE TO RELATED APPLICATIONS

This application is a U.S. national stage application of co-pending International Patent Application No. PCT/CN2018/079637, filed on Mar. 20, 2018, which claims priority to China Patent Application No. 201710232461.5, filed on Apr. 11, 2017, with the China National Intellectual Property Administration (CNIPA), the disclosures of both of which are hereby incorporated herein by reference in their entireties.

TECHNICAL FIELD

The present disclosure relates to self-service financial equipment, for example, relates to a banknote processing device and a banknote processing method.

BACKGROUND

FIG. 1 is a structural schematic view of a banknote processing device provided in the related art. As shown in FIG. 1, the banknote processing device includes a loading box 60', a recycling box 64', and a plurality of circulating boxes 61' that are arranged side by side at a lower portion of the device, and further includes an in-out port mechanism 20', an identification mechanism 30', and a temporary storage mechanism 40' that are centralized at an upper portion of the device. The identification mechanism 30' is disposed in a main passage 11'. The in-out port mechanism 20' is connected with the main passage 11' through a banknote incoming path 121' and a banknote outgoing path 122'. The temporary storage mechanism 40' is connected with the main passage 11' through a temporary storage path 13'. Each of the plurality of circulating boxes 61' is connected with the main passage 11' through a corresponding circulating passage 14'. The recycling box 64' is connected with the main passage 11' through a recycling passage 15'. The loading box 60' is connected with the main passage 11' through a loading path 16'.

When performing a banknote withdrawal operation with such banknote processing device, banknotes would enter the main passage 11' from the circulating box 61' through the circulating passage 14', and moves counterclockwise in the main passage 11' to be conveyed to the identification mechanism 30'. Depending on the identification result of the identification mechanism 30', qualified banknotes would be output to the in-out port mechanism 20' through the banknote outgoing path 122', while unqualified banknotes would continue to move counterclockwise to be recycled to the recycling box 64' through the recycling passage 15' for storage.

When performing a loading operation with such banknote processing device, banknotes in the loading box 60' would enter the main passage 11' through the loading path 16', and then move clockwise in the main passage 11 to the identification mechanism 30', and then keep moving clockwise in the main passage 11'. Depending on the identification result of the identification mechanism 30', qualified banknotes would enter one of the circulating boxes 61' through the corresponding circulating passage 14', while unqualified banknotes would enter the recycling box 64' through the recycling passage 15'.

When performing a loading and recycling operation with such banknote processing device, banknotes in the circulating box 61' would enter the main passage 11' through the circulating passage 14', and then move counterclockwise in the main passage 11 to the identification mechanism 30'. The banknotes identified by the identification mechanism 30' continues to move counterclockwise in the main passage 11', where qualified banknotes would enter the loading box 60' through the loading path 16', while unqualified banknotes would enter the recycling box 64' through the recycling passage 15' for the storage.

When performing a banknote withdrawal operation from the loading box with such banknote processing device, banknotes in the loading box 60' would enter the main passage 11' through the loading path 16', and then move clockwise in the main passage 11 to the identification mechanism 30', and would keep moving in the clockwise direction in the main passage 11', where qualified banknotes are output to the in-out mechanism 20' while unqualified banknotes continue to move in the clockwise direction to be recycled to the recycling box 64' for storage through the recycling passage 15'.

During the above-mentioned banknote withdrawal operation, loading operation, loading and recycling operation, and banknote withdrawal operation from the loading box, the banknotes would pass a junction (i.e., at a dotted line in FIG. 1) of the loading passage 16' and the main passage 11' whether the banknote moves counterclockwise or clockwise, where banknotes are easy to get jammed at the junction of the loading passage 16' and the main passage 11'.

SUMMARY

The present disclosure may overcome the deficiencies of the related art, and provides a banknote processing device that can reduce the probability of banknote jamming.

The present disclosure further provides a banknote processing method based on the above-mentioned banknote processing device.

The banknote processing device provided by an embodiment includes an identification mechanism, an in-out mechanism, a loading box, a circulating box, a main passage, an auxiliary passage, an in-out passage, a loading passage and a circulating passage. The auxiliary passage is of an annular shape, and both ends of the main passage are each connected to the auxiliary passage. A banknote is allowed to move in a one-way direction along a preset direction in the auxiliary passage. The identification mechanism is disposed in the main passage. The in-out passage is connected between the main passage and the in-out mechanism. A first end of the circulating passage is connected to the main passage, and a second end of the circulating passage is connected to the circulating box. A first end of the loading passage is connected to the auxiliary passage, and a second end of the loading passage is connected to the loading box.

In an embodiment, the auxiliary passage includes a first passage, a second passage, and a third passage, which are annularly distributed. A first end of the first passage, a second end of the third passage, and a second end of the main passage intersect with each other. A second end of the first passage, a first end of the second passage, and a first end of the loading passage intersect with each other. And a second end of the second passage, a first end of the third passage, and a first end of the main passage intersect with each other.

In an embodiment, the banknote processing device further includes a recycling box and a recycling passage. A first end of the recycling passage is connected to the auxiliary passage, and a second end of the recycling passage is connected to the recycling box.

In an embodiment, the first end of the recycling passage is connected to the first passage.

In an embodiment, a first switching member is arranged at an intersection of the first end of the loading passage, the first end of the second passage, and the second end of the first passage, and is configured to selectively communicate the first end of the loading passage with the second end of the first passage or with the first end of the second passage.

In an embodiment, a second switching member is arranged at an intersection of the second end of the second passage, the first end of the third passage, and the first end of the main passage, and is configured to selectively communicate the first end of the main passage with the second end of the second passage or with the first end of the third passage.

In an embodiment, the first switching member and the second switching member are each a bi-directional switching member.

In an embodiment, the first end of the first passage is in communication with the second end of the third passage and with the second end of the main passage, and the second end of the third passage is not in communication with the second end of the main passage.

In an embodiment, the in-out mechanism includes an inlet and an outlet, and the in-out passage includes a banknote incoming path and a banknote outgoing path. The inlet is connected to the main passage through the banknote incoming path, and the outlet is connected to the main passage through the banknote outgoing path.

In an embodiment, a junction of the banknote incoming path and the main passage is located between the first end of the main passage and the identification mechanism, and a junction of the banknote outgoing path and the main passage is located between the second end of the main passage and the identification mechanism.

In an embodiment, the in-out passage further includes a connecting path. A first end of the connecting path is connected to the banknote incoming path, and a second end of the connecting path is connected to the banknote outgoing path.

There is further provided a banknote processing method that is realized based on the above-mentioned banknote processing device, the method including at least one of the following steps.

The banknote processing method includes at least one selected from the group consisting of the following operations:

a banknote deposit operation, in which banknotes are made to enter the main passage from the in-out mechanism through the in-out passage, and then enter the identification mechanism along the main passage; the banknotes identified as qualified by the identification mechanism are made to sequentially pass through the main passage and the circulating passage to enter the circulating box; and the banknotes identified as unqualified by the identification mechanism are made to sequentially pass through the main passage and the in-out passage to enter the in-out mechanism;

a banknote deposit cancelling operation, in which the banknotes are made to sequentially pass through the circulating passage and the main passage from the circulating box to enter the identification mechanism, and the banknotes that pass through the identification mechanism are made to sequentially pass through the main passage and the in-out passage to enter the in-out mechanism;

a banknote withdrawal operation, in which banknotes sequentially pass through the circulating passage and the main passage from the circulating box to enter the identification mechanism; the banknotes identified as qualified by the identification mechanism are made to sequentially pass through the main passage and the in-out passage to enter the in-out mechanism, and the banknotes identified as unqualified by the identification mechanism are made to sequentially pass through the main passage, the auxiliary passage, and the recycling passage to enter the recycling box; where the banknotes are allowed to move in a one-way direction along a preset direction in the auxiliary passage;

a loading operation, in which banknotes in the loading box are made to sequentially pass through the loading passage, the auxiliary passage, and the main passage to enter the identification mechanism; the banknotes identified as qualified by the identification mechanism are made to sequentially pass through the main passage and the circulating passage to enter the circulating box, and the banknotes identified as unqualified by the identification mechanism are made to sequentially pass through the main passage, the auxiliary passage, and the recycling passage to enter the recycling box; where the banknotes are allowed to move in a one-way direction along a preset direction in the auxiliary passage;

a loading and recycling operation, in which banknotes in the circulating box are made to sequentially pass through the circulating passage, and the main passage to enter the identification mechanism; the banknotes identified as qualified by the identification mechanism are made to sequentially pass through the main passage, the auxiliary passage, and the loading passage to enter the loading box, and the banknotes identified as unqualified by the identification mechanism are made to sequentially pass through the main passage, the auxiliary passage, and the recycling passage to enter the recycling box; where the banknotes are allowed to move in a one-way direction along a preset direction in the auxiliary passage;

a banknote withdrawal operation from the loading box, in which the banknotes in the loading box are made to sequentially pass through the loading passage, the auxiliary passage, and the main passage to enter the identification mechanism; the banknotes identified as qualified by the identification mechanism are made to sequentially pass through the main passage and the in-out passage to enter the in-out mechanism, and the banknotes identified as unqualified by the identification mechanism are made to sequentially pass through the main passage, the auxiliary passage, and the recycling passage to enter the recycling box; where the banknotes are allowed to move in a one-way direction along a preset direction in the auxiliary passage; and an ignored banknotes recycling operation, in which the banknotes in the in-out mechanism are made to sequentially pass through the in-out passage and the main passage to enter the identification mechanism; the banknotes that pass through the identification mechanism are made to sequentially pass through the main passage, the auxiliary passage, and the recycling passage to enter the recycling box; and the banknotes are allowed to move in a one-way direction along a preset direction in the auxiliary passage.

According to the banknote processing device provided by the present disclosure, the banknotes moves in a one-way direction along a preset direction. Therefore, in the banknote withdrawal operation, the banknotes do not pass through the junction of the loading passage and the auxiliary passage, thereby reducing the probability of banknote jamming.

In the banknote processing method provided by the present disclosure, the banknotes always move in a one-way direction along the preset direction in the annular auxiliary passage when located in the auxiliary passage, and in the banknote withdrawal operation, the banknotes don't not pass through the junction of the loading passage and the auxiliary passage, thereby reducing the probability of banknote jamming.

Figure 1:
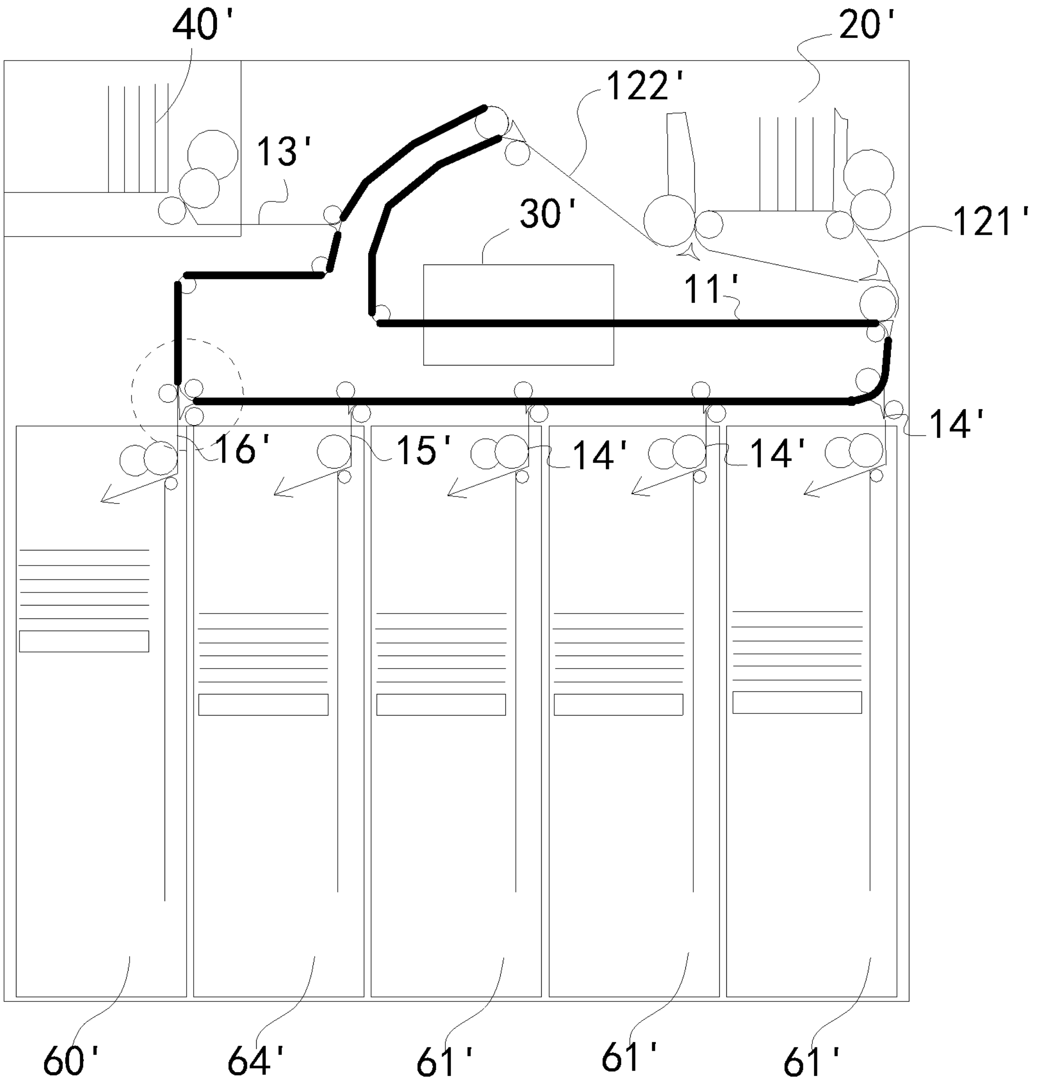
FIG. 1 is a structural schematic view of a banknote processing device provided in the related art.

11'—Main passage; 13'—Temporary storage path; 14'—Circulating passage; 15'—Recycling passage; 16'—Loading path; 20'—In-out mechanism; 30'—Identification mechanism; 40'—Temporary storage mechanism; 60'—Loading box; 61'—Circulating box; 64'—Recycling box; 121'—Banknote incoming path; 122'—Banknote outgoing path; 10—Banknote processing device; 100—In-out mechanism; 101—In-out passage; 110—Inlet; 120—Outlet; 130—Identification mechanism; 131—Identification passage; 150—Circulating box; 151—Circulating passage; 160—Recycling box; 161—Recycling passage; 170—Loading box; 171—Loading passage; 210—Main passage; 211—First path; 212—Second path; 213—Third path; 214—Fourth path; 220—Auxiliary passage; 221—First passage; 222—Second passage; 223—Third passage; 230—Banknote incoming path; 231—First banknote incoming path; 232—Second banknote incoming path; 240—Banknote outgoing path; 241—First banknote outgoing path; 242—Second banknote outgoing path; 250—Connecting path; 310—First switching member; 320—Second switching member.

DETAILED DESCRIPTION

In the present embodiment, similar reference numerals and letters indicate similar items in the following figures, and therefore, once a particular item is defined in a drawing, the item need not be further defined and explained in following figures.

In the description of the present disclosure, the terms "first", "second", etc. are used for the mere purpose of distinguishing the description, and are not to be construed as indicating or implying relative importance.

Figure 2:
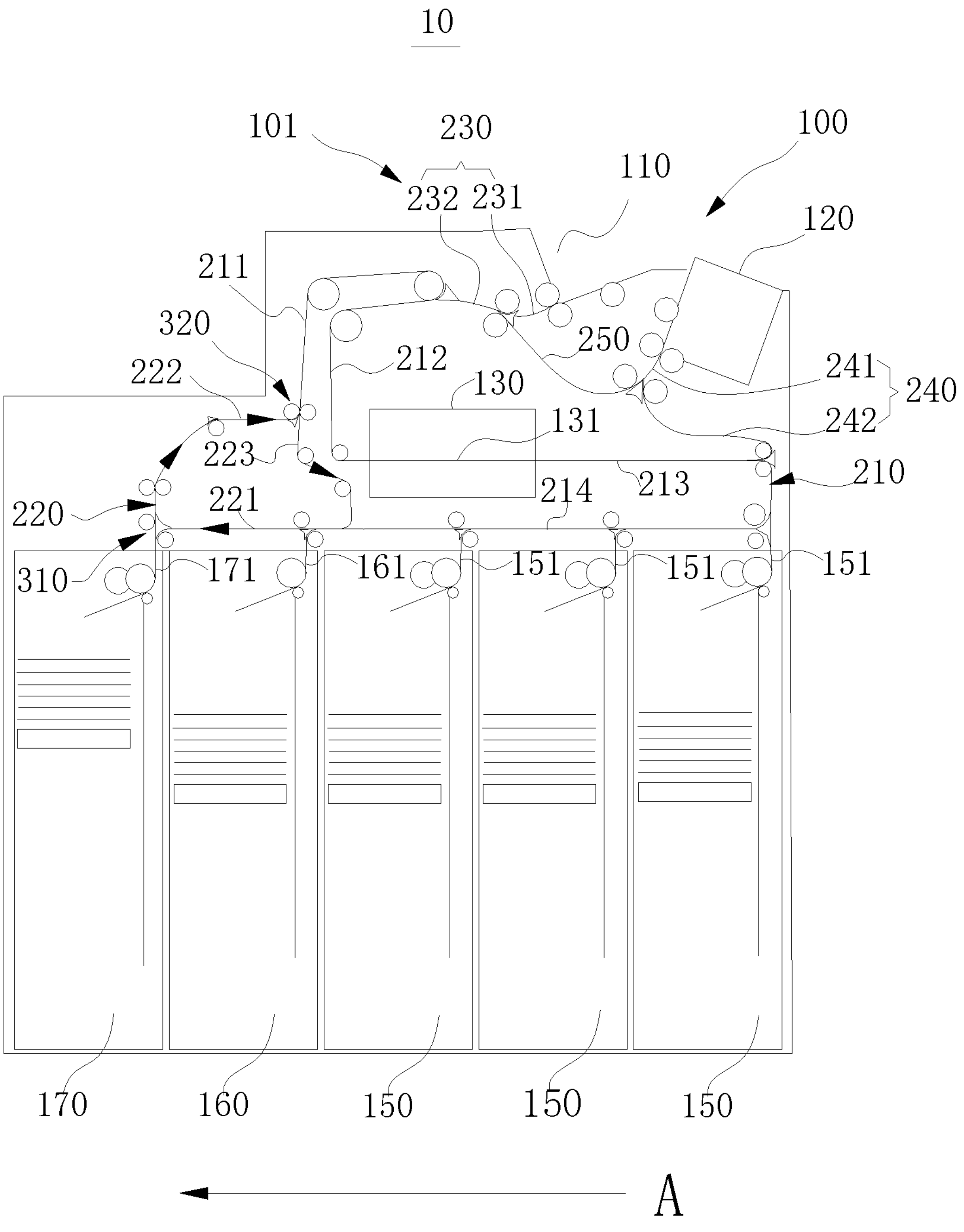
FIG. 2 is a structural schematic view of a banknote processing device according to an embodiment of the present disclosure.

Referring to FIG. 2, there is shown a schematic structural diagram of a banknote processing device 10 according to an embodiment of the present disclosure. As can be seen in FIG. 2, the banknote processing device 10 includes an identification mechanism 130, an in-out mechanism 100, a loading box 170, a circulating box 150, a main passage 210, an auxiliary passage 220, an in-out passage 101, a loading passage 171, and a circulating passage 151.

The in-out mechanism 100 is disposed at an upper portion of the banknote processing device 10 and is configured for a user to put in or take away banknotes. The in-out mechanism 100 further includes an inlet 110 and an outlet 120. The inlet 110 and the outlet 120 both face toward the user. The inlet 110 is configured to allow the user to put in banknotes, and configured to then put the banknotes into the inside of the device one by one. The outlet 120 is configured to output banknotes from the device and await the user to take the banknotes away. The identification mechanism 130 is configured to identify the banknotes, and includes an identification passage 131 in which the denomination, currency, authenticity, and state of each banknote is able to be identified when the banknotes passes through the identification passage 131, where a state of the banknote includes a degree of damage, a degree of oldness or newness, and a version of the banknote. When identified as genuine banknotes, the banknotes would be divided into a rejected banknote and a normal banknote depending on the state of the banknote identified by the identification mechanism 130. In the present embodiment, a normal banknote is also referred to as a qualified banknote, that is, a banknote that meets a preset condition. A rejected banknote is also referred to as an unqualified banknote, that is, a banknote that does not meet the preset condition. Among them, the banknote that is not suitable for circulation, with respect to the degree of damage, the degree of oldness or newness, and the version for example, are determined as a rejected banknote, while the banknote that is suitable for continued circulation, with respect to the degree of damage, the degree of oldness or newness, and the version for example, are determined as a normal banknote. The number of the circulating boxes 150 may be multiple, which are configured to store and output banknotes depending on the currency type. In an embodiment, the banknote processing device 10 may further include a recycling box 160 and a recycling passage 161. The recycling box 160 is configured to receive unqualified banknotes, and based on a preset configuration may also be used as an ignored banknotes storage box configured to recycle the banknotes that are ignored by the user. The loading box 170 is configured to replenish banknotes to the circulating box 150 or to receive banknotes overflowing from the circulating box 150, and may also be configured to count and sort out the banknotes in the plurality of circulating boxes 150. In an embodiment, the loading box 170 may also be used as a circulating box 150. In the present embodiment, the banknote processing device 10 includes three circulating boxes 150, where the three circulating boxes 150, the recycling box 160, and the loading box 170 are sequentially arranged in the direction denoted by A in FIG. 2.

It can also be seen from FIG. 2 that each of the two ends of the main passage 210 is connected to the auxiliary passage 220. The auxiliary passage 220 is configured to make the banknote move in a one way direction along a preset direction (i.e., the direction indicated by the arrow in FIG. 2) in the auxiliary passage 220. The identification mechanism 130 is arranged at the main passage 210. A first end of the in-out passage 101 is connected to the main passage 210, and a second end of the in-out passage 101 is connected to the in-out mechanism 100. A first end of the circulating passage 151 is connected to the main passage 210, and a second end of the circulating passage 151 is in communication with the circulating box 150. A first end of the loading passage 171 is connected to the auxiliary passage 220, and a second end of the loading passage 171 is connected to the loading box 170. A first end of the recycling passage 161 is connected to the auxiliary passage 220, and a second end of the recycling passage 161 is connected to the recycling box 160.

With continued reference to FIG. 2, in the present embodiment, the in-out mechanism 100 includes an inlet 110 and an outlet 120. The in-out passage 101 includes a banknote incoming path 230 and a banknote outgoing path 240. The inlet 110 is connected to the main passage 210 through the banknote incoming path 230. The outlet 120 is connected to the main passage 210 through the banknote outgoing path 240. Optionally, a junction of the banknote incoming path 230 and the main passage 210 is located between the first end of the main passage 210 and the identification mechanism 130, and a junction of the banknote outgoing path 240 and the main passage 210 is located between the second end of the main passage 210 and the identification mechanisms 130. In the present embodiment, the in-out passage 101 may further include a connecting path 250. One of two ends of the connecting path 250 is connected to the banknote incoming path 230, and another of two ends of the connecting path 250 is connected to the banknote outgoing path 240.

In an embodiment, the main passage 210 includes a first path 211, a second path 212, an identification passage 131, a third path 213, and a fourth path 214 that are sequentially connected to each other. A second end of the first path 211 is connected to a first end of the second path 212, a second end of the second path 212 is connected to a first end of the identification passage 131, a second end of the identification passage 131 is connected to a first end of the third path 213, and a second end of the third path 213 is connected to a first end of the fourth path 214.

The auxiliary passage 220 is located between the first end of the main passage 210 (i.e., the first end of the first path 211) and the second end of the main passage 210 (i.e., the second end of the fourth path 214). The auxiliary passage 220 includes a first passage 221, a second passage 222, and a third passage 223 that are annularly distributed. A second end of the first passage 221 and a first end of the second passage 222 both intersect with the first end of the loading passage 171. A first switching member 310 is disposed at the intersection of the three, and is a bi-directional switching member configured to selectively communicate the loading passage 171 with the first passage 221 or with the second passage 222, where the first passage 221 and the second passage 222 are not in communication with each other. The second end of the loading passage 171 is in communication with the loading box 170 so that the loading box 170 may receive the banknotes delivered from the first passage 221 or convey the banknotes in the loading box 170 into the second passage 222. A second end of the second passage 222 and a first end of the third passage 223 both intersect with the first end of the main passage 210, and the second switching member 320 is disposed at the intersection of the three and is a bi-directional switching member configured to selectively communicate the first path 211 of the main passage 210 with the second passage 222 or with the third passage 223, where the second passage 222 is not in communication with the third passage 223. Thereby, the main passage 210 may receive the banknotes delivered from the second passage 222, and may also convey the banknotes in the main passage 210 into the third passage 223. The first end of the first passage 221 is also in communication with a second end of the third passage 223 and the second end of the main passage 210, where the main passage 210 is not in communication with the third passage 223, so that the first passage 221 is able to receive the banknotes delivered from the main passage 210 or from the third passage 223.

Optionally, the banknotes move in the one way direction along a preset direction (i.e., the direction indicated by the arrow in FIG. 2) in the first passage 221, the second passage 222, and the third passage 223. As a result, banknotes can be prevented from being jammed in the auxiliary passage 220.

The banknote incoming path 230 is connected between the inlet 110 and the main passage 210, and includes a first banknote incoming path 231 and a second banknote incoming path 232 that are connected with each other. Optionally, the inlet 110 is connected to the first end of the first banknote incoming path 231, the second end of the first banknote incoming path 231 is connected to the first end of the second banknote incoming path 232, and the second end the second banknote incoming path 232 is connected to the main passage 210. The first end of the first banknote incoming path 231 is in communication with the inlet 110, and the second end of the second banknote incoming path 232 intersects with the first path 211 and the second path 212 of the main passage 210. The intersection of the three is provided a switching member configured to selectively communicate the second path 212 with the first path 211 or with the second banknote incoming path 232. The banknote outgoing path 240 includes a first banknote outgoing path 241 and a second banknote outgoing path 242 that are connected to each other. A first end of the first banknote outgoing path 241 is in communication with the outlet 120, and a second end of the first banknote outgoing path 241 is in communication with a first end of the second banknote outgoing path 242. A second end of the second banknote outgoing path 242 intersects with the third path 213 and the fourth path 214 of the main passage 210, and the intersection of the three is provided with the switching member configured to selectively communicate the third path 213 with the fourth path 214 or with the second banknote outgoing path 242. The banknote processing device 10 further includes a connecting path 250 connected between the banknote incoming path 230 and the banknote outgoing path 240. A first end of the connecting path 250 intersects with the first banknote incoming path 231 and the second path 212, and the intersection of the three is provided a switching member configured to selectively communicate the second banknote incoming path 232 with the first banknote incoming path 231 or with the connecting path 250. A second end of the connecting path 250 intersects with the first banknote outgoing path 241 and the second banknote outgoing path 242, and the intersection of the three is provided with a switching member configured to selectively communicate the first banknote outgoing path 241 with the second banknote outgoing path 242 or with the connecting path 250.

The recycling passage 161 is connected between the auxiliary passage 220 and the recycling box 160. The first end of the recycling passage 161 intersects with the first passage 221, and the intersection of the two is provided with a switching member configured to communicate or disconnect the recycling passage 161 with the first passage 221. The number of the circulating passages 151 is equal to that of the circulating boxes 150, and one of the circulating boxes 150 is connected to a circulating passage 151, and the circulating passage 151 intersects with the fourth path 214 of the main passage 210, where the intersection of each of the circulating passages 151 with the fourth path 214 is provided with a switching member configured to communicate or disconnect the fourth path 214 with the circulating box 150.

In an embodiment, the banknote processing device 10 further includes a motor configured to drive the banknotes to move, an electromagnet that drives each of the plurality of switching members, and sensors (not shown in the figures) that are arranged in a plurality of paths and a plurality of passages and configured to detect the banknotes.

The operation process of the banknote processing device 10 provided in the present embodiment will be described below.

Figure 3:
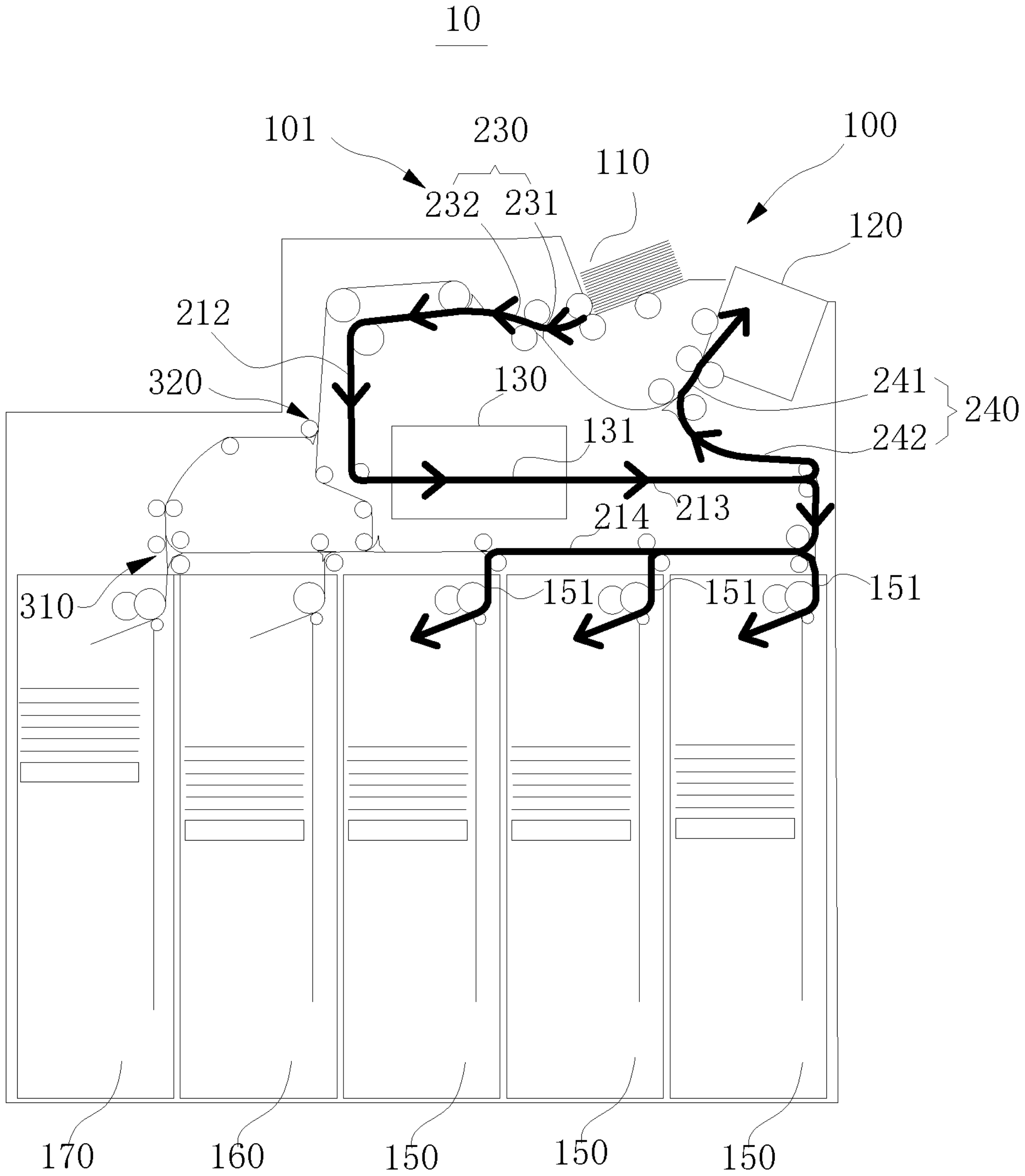
FIG. 3 is a schematic view of a banknote processing device when performing a banknote deposit operation according to an embodiment of the present disclosure.

Referring to FIG. 3, there is shown a schematic view (the arrow and the thick solid line in the figure indicate the moving path of the banknotes) of the banknote processing device 10 when performing a deposit operation according to an embodiment. As shown in FIG. 3, when the user places banknotes at the inlet 110, the corresponding switching member is controlled to communicate the first banknote incoming path 231 with the second banknote incoming path 232, and communicate the second banknote incoming path 232 with the second path 212. The banknotes at the inlet 110 are conveyed one by one into the first banknote incoming path 231, and after passing through the second banknote incoming path 232 and the second path 212, the banknotes arrive at the identification mechanism 130 for identification, and the banknotes identified by the identification mechanism 130 are conveyed into the third path 213. Depending on the identification result of the identification mechanism 130, when a banknote is determined as qualified, the corresponding switching member would be controlled to communicate the third path 213 with the fourth path 214, and communicate the fourth path 214 with the circulating passage 151 of the corresponding circulating box 150. The qualified banknotes then enter the circulating box 150 for storage through the third path 213, the fourth path 214, and the corresponding circulating passage 151. The inlet 110 is opened widely so that banknotes can be continuously added, making the banknote processing device 10 according to the present embodiment more suitable for depositing large amounts of banknotes.

When a banknote is determined as unqualified, the corresponding switching member is controlled to communicate the third path 213 with the second banknote outgoing path 242, and communicate the second banknote outgoing path 242 with the first banknote outgoing path 241, and then the unqualified banknote is returned to the outlet 120 through the third path 213, the second banknote outgoing path 242, and the first banknote outgoing path 241, to be returned to the user.

Figure 4:
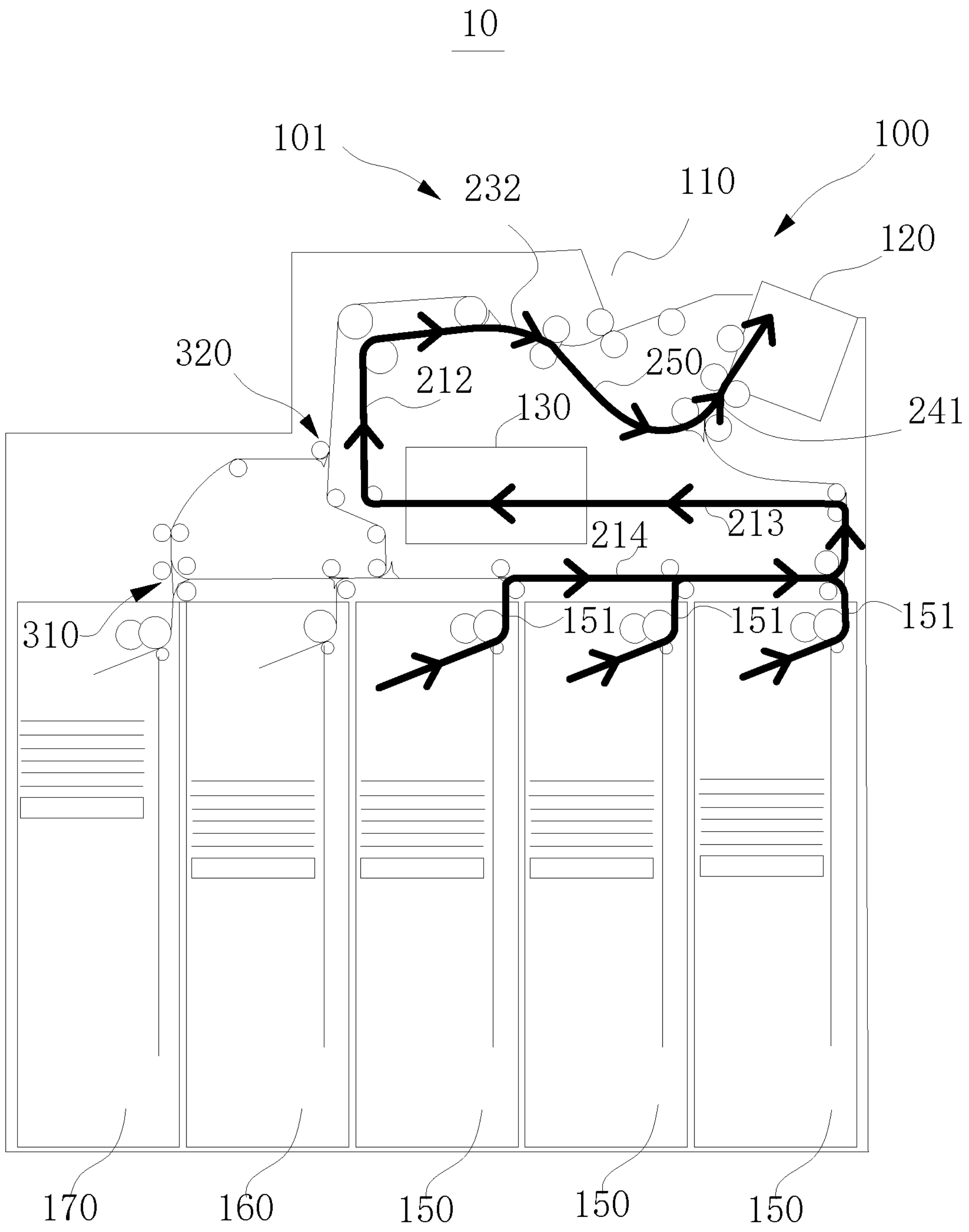
FIG. 4 is a schematic view of a banknote processing device when cancelling a banknote deposit operation according to an embodiment of the present disclosure.

Referring to FIG. 4, there is shown a schematic view (the arrow and the thick solid line in the figure indicate the moving path of the banknotes) of the banknote processing device 10 when cancelling a banknote deposit operation according to an embodiment. As shown in FIG. 4, when the user enter information for cancelling a deposit transaction, the corresponding switching member is controlled to communicate the corresponding circulating passage 151 with the fourth path 214, the fourth path 214 with the third path 213, the second path 212 with the second banknote incoming path 232, the second banknote incoming path 232 with the connecting path 250, and the connecting path 250 with the first banknote outgoing path 241. The banknotes in the circulating box 150 are conveyed to the identification mechanism 130 through the circulating passage 151, the fourth path 214, and the third path 213, and then are delivered to the outlet 120 through the identification passage 131, the second path 212, the second banknote incoming path 232, the connecting path 250, and the first banknote outgoing path 241, to be returned to the user.

Figure 5:
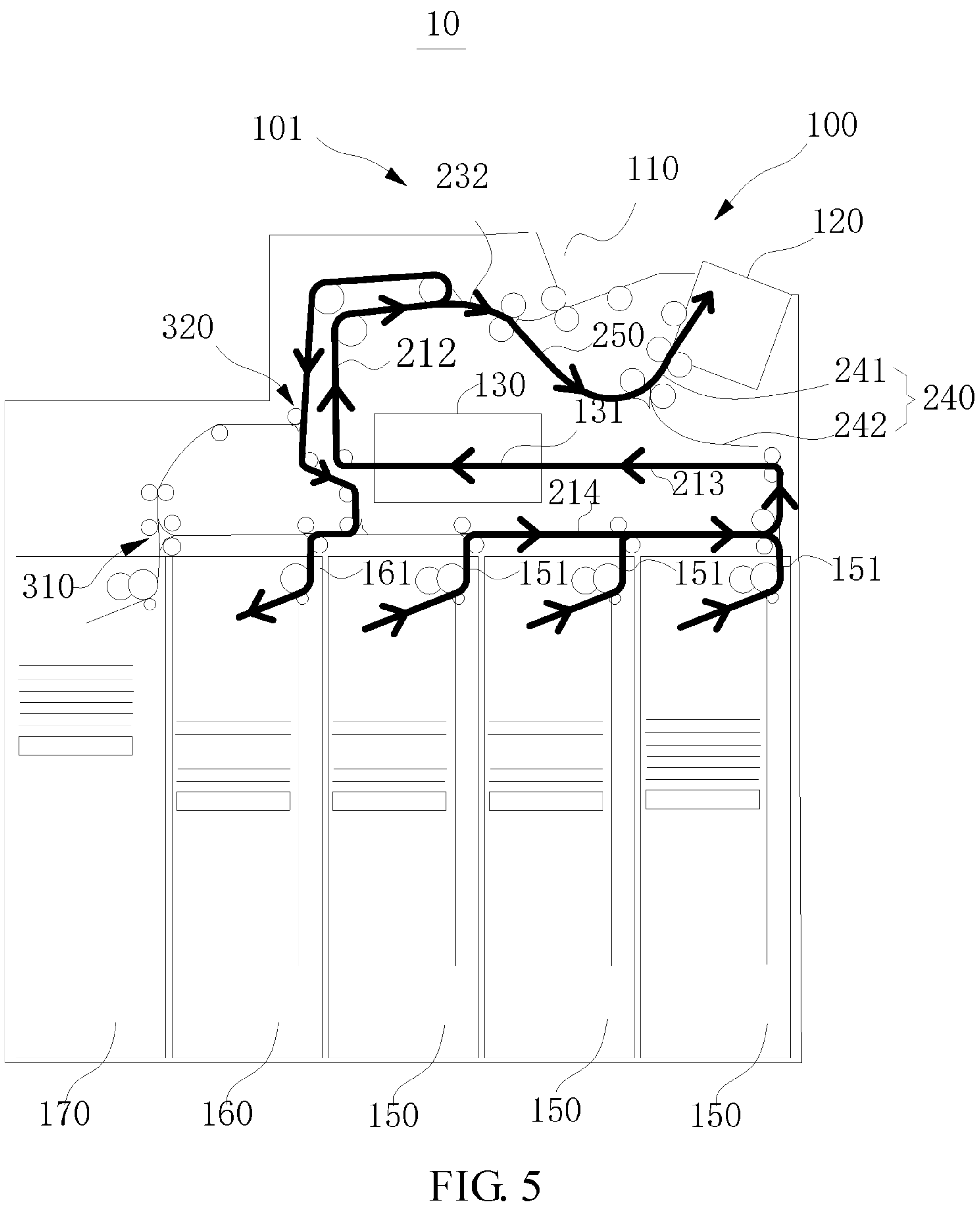
FIG. 5 is a schematic view of a banknote processing device when performing a banknote withdrawal operation according to an embodiment of the present disclosure.

Referring to FIG. 5, there is shown a schematic view (the arrow and the thick solid line in the figure indicate the moving path of the banknote) of the banknote processing device 10 when performing a withdrawal operation according to an embodiment. As shown in FIG. 5, when the user withdraws banknotes, the corresponding switching member is controlled to communicate the corresponding circulating passage 151 with the fourth path 214, and communicate the fourth path 214 with the third path 213. The banknotes are conveyed into the fourth path 214 from the circulating box 150 through the corresponding circulating passage 151, and then are delivered to the identification mechanism 130 through the third path 213 for identification. Depending on the identification result of the identification mechanism 130, when a banknote is determined as a qualified banknote, the corresponding switching member is controlled to communicate the second path 212 with the second banknote incoming path 232, the second banknote incoming path 232 with the connecting path 250, and the connecting path 250 with the first banknote outgoing path 241, and then the banknote is further conveyed to the outlet 120 through the second path 212, the second banknote incoming path 232, the connecting path 250, and the first banknote outgoing path 241 awaiting the user to take it away. Otherwise, when a banknote is determined as unqualified, the corresponding switching member is controlled to communicate the second path 212 with the first path 211, the first path 211 with the third passage 223, and the second passage 222 with the recycling passage 161, and then the banknote is conveyed to the recycling box 160 through the second path 212, the first path 211, the third passage 223, the first passage 221, and the recycling passage 161 for storage.

Figure 6:
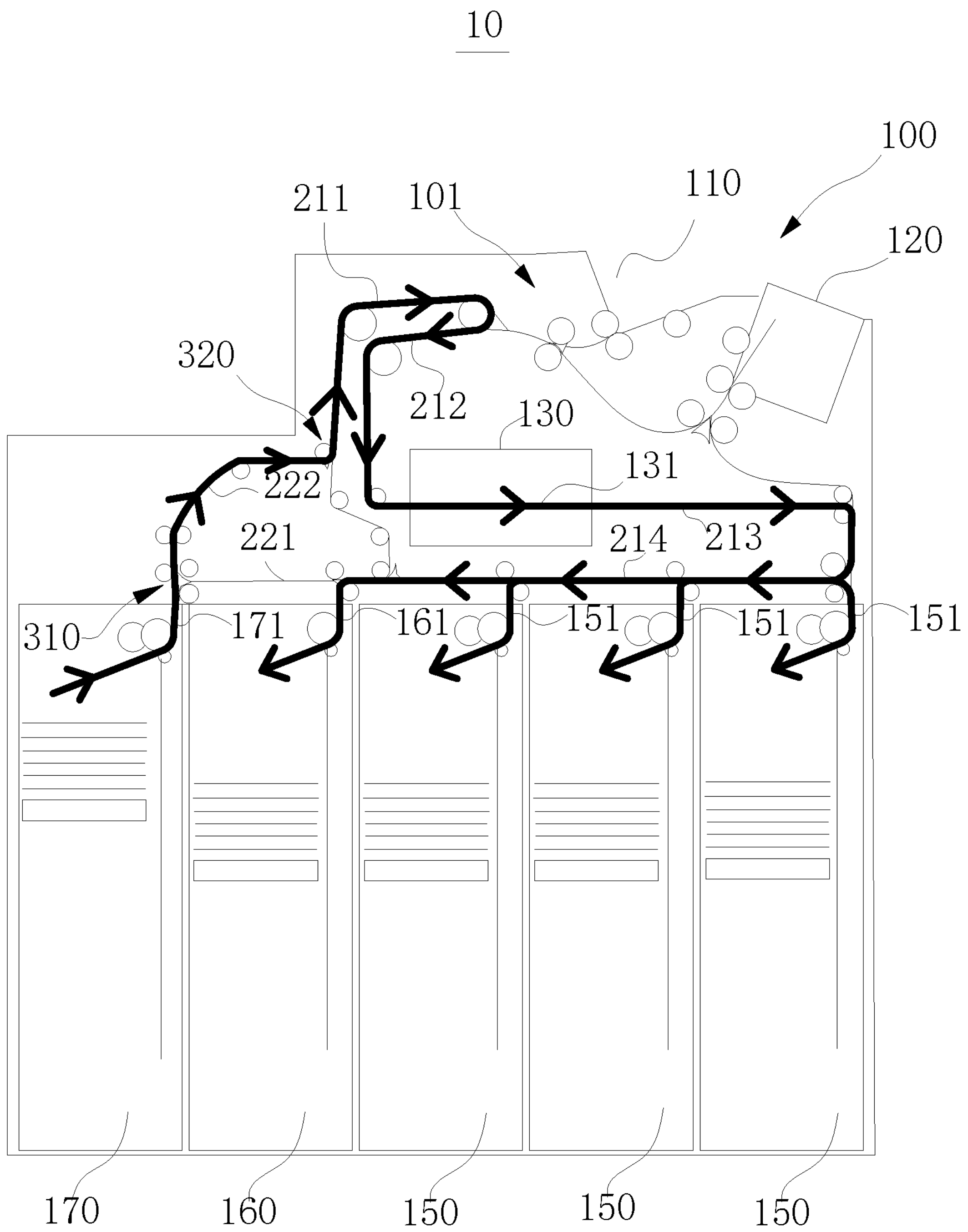
FIG. 6 is a schematic view of a banknote processing device when performing a loading operation according to an embodiment of the present disclosure.

Referring to FIG. 6, there is shown a schematic view (the arrow and the thick solid line in the figure indicate the moving path of the banknotes) of the banknote processing device 10 when performing a loading operation according to an embodiment. The term "loading" means that the banknotes in the loading box 170 are delivered into a preset circulating box 150, that is, the banknote is replenished into the preset circulating box 150. The process is shown in FIG. 6, the corresponding switching member is controlled to communicate the loading passage 171 with the second passage 222, communicate the second passage 222 with the first path 211 of the main passage 210, and communicate the first path 211 with the second path 212. The banknotes in the loading box 170 are delivered to the identification mechanism 130 through the loading passage 171, the second passage 222, the first path 211, and the second path 212 for identifying the currency type and the state of the banknote. Depending on the identification result of the identification mechanism 130, when a banknote is determined as a qualified banknote, the corresponding switching member is controlled to communicate the third path 213 with the fourth path 214, and the fourth path 214 is controlled to communicate with the corresponding circulating passage 151 depending on the currency type of the banknote, and the banknote is delivered to the corresponding box 150 for storage through the third path 213, the fourth path 214, the corresponding circulating passage 151. By such a loading operation, the banknotes output from the loading box 170 are directly distributed to the corresponding circulating box 150, resulting in a high loading efficiency. When a banknote is determined as unqualified, the corresponding switching member is controlled to communicate the first passage 221 with the recycling passage 161, and the banknote continues to move to the first passage 221 along the fourth path 214 and is delivered to the recycling box 160 for storage through the recycling passage 161. Because the first passage 221 is in communication with the fourth path 214, and the junction of the recycling passage 161 and the first passage 221 and the junction of the loading passage 171 and the first passage 221 are sequentially arranged along the first passage 221, the qualified banknotes are delivered to the corresponding circulating box 150 along the fourth path 214, the unqualified banknotes are delivered to the first passage 221 along the fourth path 214 and are returned to the recycling box 160 through the recycling passage 161, while the loading box 170 continues to output the banknotes from the loading path 171 to the second passage 222. During the banknote loading process which the banknotes are delivered from the loading passage 171 into the main passage 210 through the second passage 222 and then from the main passage 210 into the first passage 221, they are always moving in a single direction, so that three operations can be simultaneously performed, including outputting banknotes from the loading box 170, conveying banknotes to the circulating box 150, and conveying banknotes to the recycling box 160, thereby improving the loading efficiency.

In an embodiment, the banknote processing device 10 may further have a loading and recycling function, where the loading and recycling of the banknotes means the banknotes of the circulating box 150 moving to the loading box 170.

Figure 7:
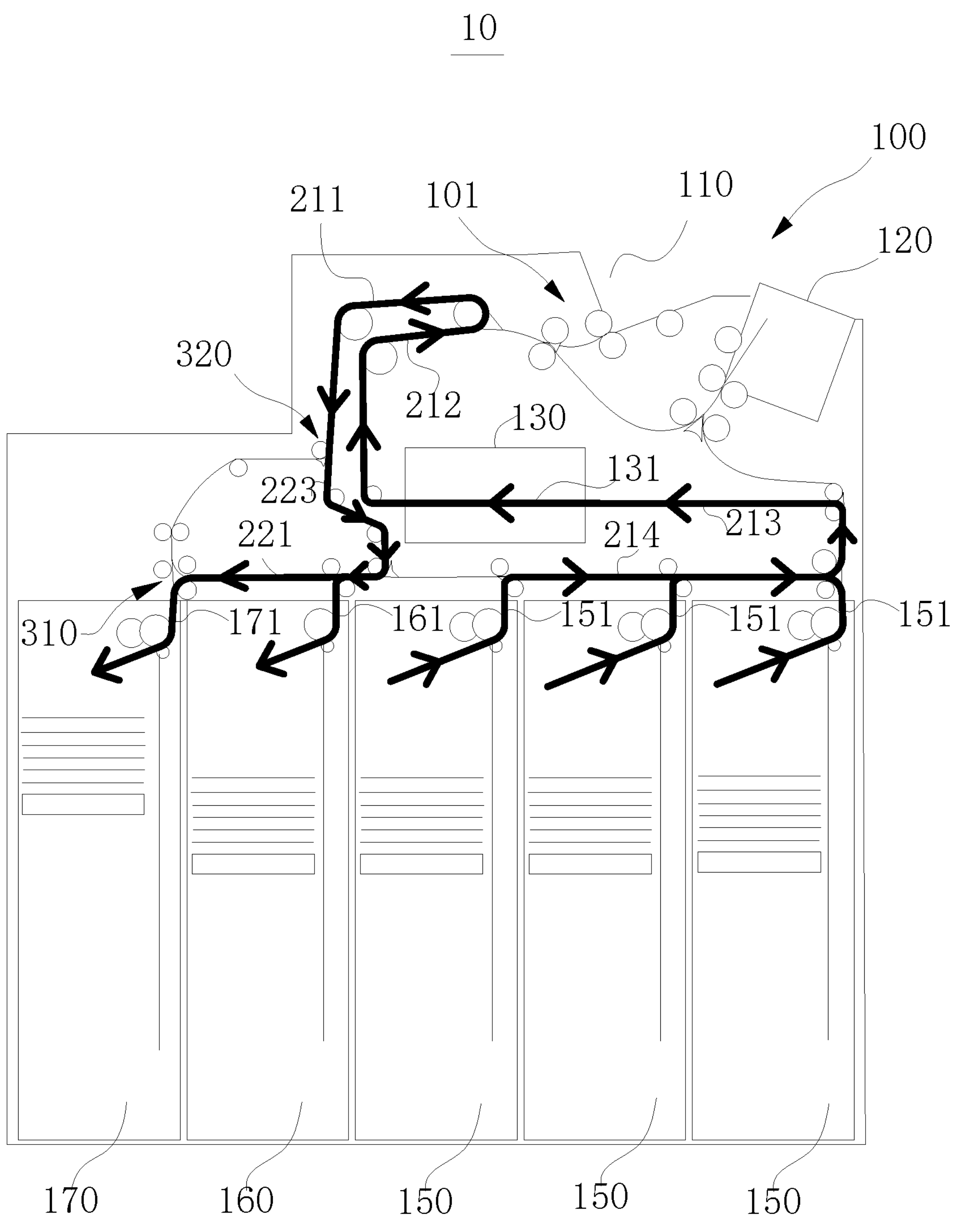
FIG. 7 is a schematic view of a banknote processing device when performing a loading and recycling operation according to an embodiment of the present disclosure.

Referring to FIG. 7, there is shown a schematic view (the arrow and the thick solid line in the figure indicate the moving path of the banknote) of the banknote processing device 10 when performing a loading and recycling operation according to an embodiment. As shown in FIG. 7, firstly, the corresponding switching member is controlled to communicate the circulating passage 151 corresponding to the set circulating box 150 with the fourth path 214, and to communicate the fourth path 214 with the third path 213. The banknote in the circulating box 150 is delivered to the identification mechanism 130 after entering the fourth path 214 and the third path 213 through the circulating passage 151. Depending on the identification result of the identification mechanism 130, when a banknote is determined as qualified, the corresponding switching member is controlled to communicate the second path 212 with the first path 211, communicate the first path 211 with the third passage 223, communicate the third passage 223 with the first passage 221, and communicate the first passage 221 with the loading passage 171, and the banknote is delivered into the loading box 170 for storage along the second path 212, the first path 211, the third passage 223, the first passage 221 and the loading passage 171. When the banknote is determined as unqualified, the corresponding switching member is controlled to communicate the first passage 221 with the recycling passage 161, and the banknote is delivered into the recycling box 160 for storage through the first passage 221 and the recycling passage 161. In the above-mentioned loading and recycling process, the loading and recycling efficiency is high because the banknote moves in the first passage 221 and sequentially enters the loading passage 171 or the recycling passage 161 that are in communication with the first passage 221.

The banknote processing device 10 according to the present embodiment may also use the loading box 170 as the circulating box 150. That is, when the amount of the banknotes in the circulating box 150 is less than a set value, the withdrawal from the circulating box 150 may be stopped and the banknotes may be directly withdrawn from the loading box 170, thereby preventing the shutdown issues caused by a small amount of banknotes in the circulating box 150, thereby improving the operating efficiency.

Figure 8:
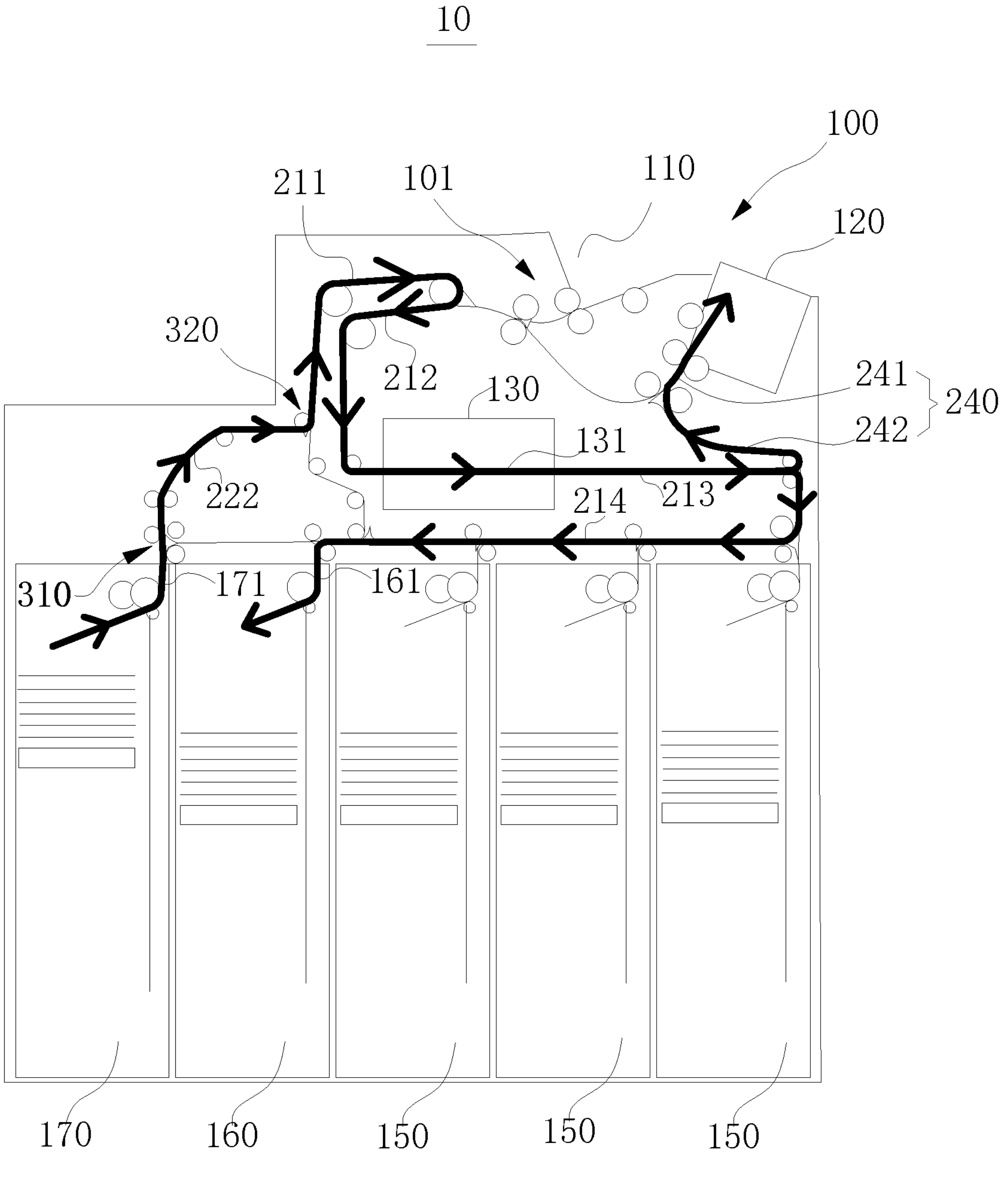
FIG. 8 is a schematic view of a banknote processing device when performing a banknote withdrawal operation from the loading box according to an embodiment of the present disclosure.

Referring to FIG. 8, there is shown a schematic view (the arrow and the thick solid line in the figure indicate the moving path of the banknote) of the banknote processing device 10 when performing the withdrawal operation from the loading box 170 according to an embodiment of the present disclosure. As shown in FIG. 8, the corresponding switching member is controlled to communicate the loading passage 171 with the second passage 222, to communicate the second passage 222 with the first path 211, and to communicate the first path 211 with the second path 212. The banknotes in the loading box 170 enter the loading passage 171, the second passage 222, the first path 211, and the second path 212 and then are delivered to the identification mechanism 130. Depending on the identification result of the identification mechanism 130, when the banknote is determined as qualified, the corresponding switching member is controlled to communicate the third path 213 with the second banknote outgoing path 242, and to communicate the second banknote outgoing path 242 with the first banknote outgoing path 241, and the banknote is delivered to the outlet 120 through the third path 213, the second banknote outgoing path 242, and the first banknote outgoing path 241 awaiting the user to take it away. When the banknote is determined as unqualified, the corresponding switching member is controlled to communicate the third path 213 with the fourth path 214, to communicate the fourth path 214 with the first passage 221, to communicate the first passage 221 with the recycling passage 161, and the banknote is delivered into the recycling box 160 for storage through the third path 213, the fourth path 214, the first passage 221 and the recycling passage 161.

In order to secure the user's rights and interests, the banknote processing device 10 may also collect the banknotes that are not taken away by the user (simply referred to as the ignored banknotes) at the outlet 120 into the recycling box 160 for storage.

Figure 9:
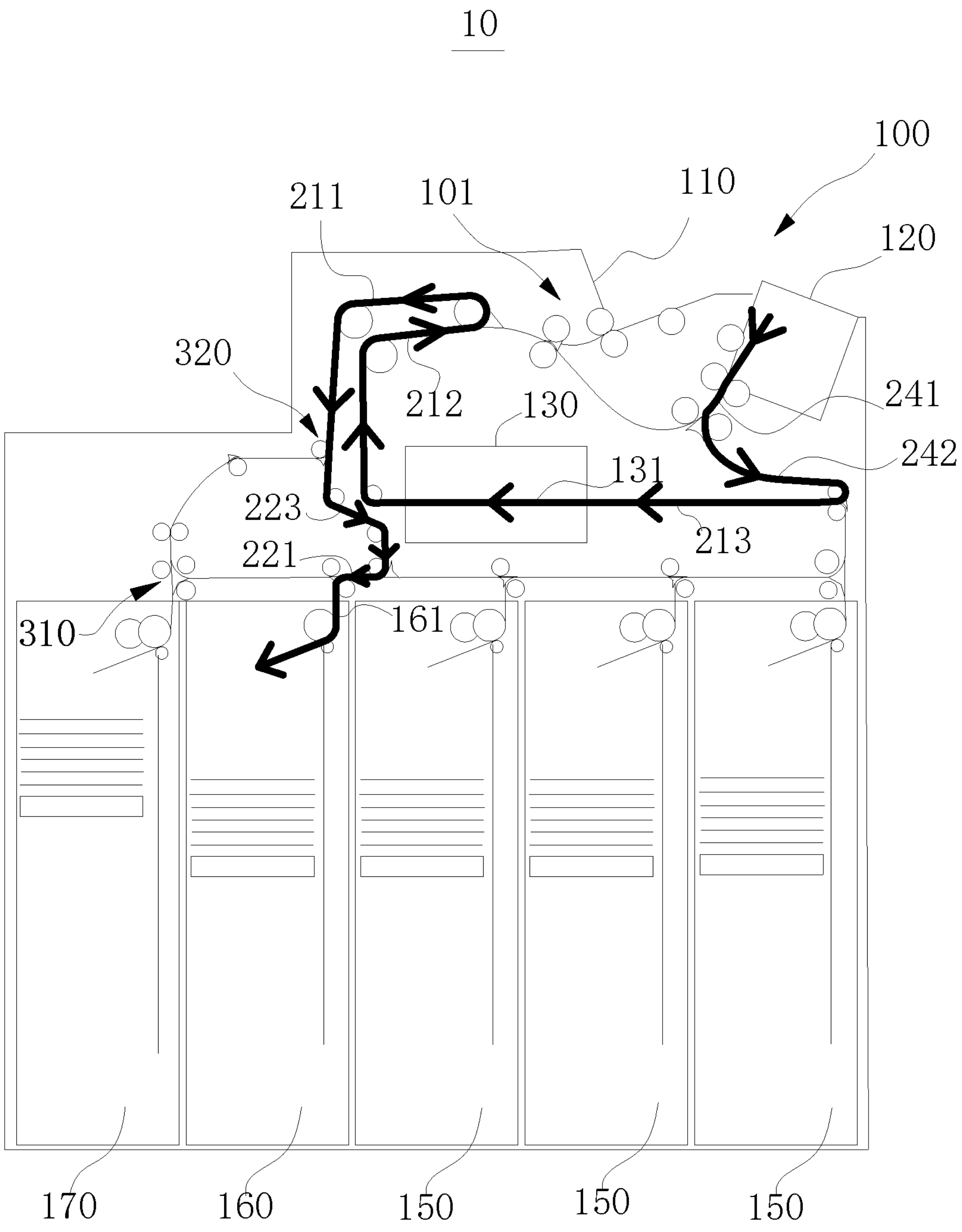
FIG. 9 is a schematic view of a banknote processing device when performing an ignored banknotes recycling operation according to an embodiment of the present disclosure.

Referring to FIG. 9, there is shown a schematic view of the banknote processing device 10 when recycling ignored banknotes according to an embodiment (the arrow and the thick solid line in the figure indicate the moving path of the banknote). As shown in FIG. 9, the corresponding switching member is controlled to communicate the first banknote outgoing path 241 with the second banknote outgoing path 242, to communicate the second banknote outgoing path 242 with the third path 213, to communicate the second path 212 with the first path 211, to communicate the first path 211 with the third passage 223, to communicate the third passage

223 with the first passage 221, and to communicate the first passage 221 with the recycling passage 161. The banknotes at the outlet 120 is delivered to the identification mechanism 130 through the first banknote outgoing path 241, the second banknote incoming path 232, and the third path 213, and after the banknote information is identified by the identification mechanism 130, the banknote is delivered into the recycling box 160 for storage through the second path 212, the first path 211, the third passage 223, the first passage 221, and the recycling passage 161.

The banknote processing device 10 provided by the present embodiment includes an auxiliary passage 220 which is annular. At most one bi-directional switching mechanism is arranged between adjacent passages of the auxiliary passage 220 to make the banknote move unidirectionally in the preset direction in the auxiliary passage 220. In the banknote withdrawal operation, the banknote does not pass through the junction of the loading passage 171 and the auxiliary passage 220. The banknote passes through the junction of the loading passage 171 and the auxiliary passage 220 only when performed the loading operation, the loading and recycling operation, and the banknote withdrawal operation from the loading box 170, and the switching mechanism at the junction is a bi-directional switching mechanism. Therefore, the probability of jamming in conveying the banknotes is reduced.

The present embodiment further provides a banknote processing method. The banknote processing method provided by the present embodiment may be realized by the banknote processing device 10 provided by the embodiment of the present disclosure.

The banknote processing method includes at least one of the following steps, referring to FIG. 3 to FIG. 9.

A banknote deposit operation, in which the banknotes enter the main passage 210 from the in-out mechanism 100 through the in-out passage 101, and enter the identification mechanism 130 along the main passage 210. Banknotes identified as qualified by the identification mechanism 130 enter the circulating box 150 sequentially through the main passage 210 and the circulating passage 151, while banknotes identified as unqualified by the identification mechanism 130 enter the in-out mechanism 100 sequentially through the main passage 210 and the in-out passage 101.

A banknote deposit cancelling operation, in which banknotes enter the identification mechanism 130 from the circulating box 150 sequentially through the circulating passage 151 and the main passage 210, and the banknotes passing through the identification mechanism 130 enter the in-out mechanism 100 sequentially through the main passage 210 and the in-out passage 101.

A banknote withdrawal operation, in which the banknotes enter the identification mechanism 130 from the circulating box 150 sequentially through the circulating passage 151 and the main passage 210. The banknotes identified as qualified by the identification mechanism 130 enter the in-out mechanism 100 sequentially through the main passage 210 and the in-out passage 101; the banknotes identified as unqualified by the identification mechanism 130 enter the recycling box 160 sequentially through the main passage 210, the auxiliary passage 220, and the recycling passage 161. And the banknotes move in the one-way direction along the preset direction in the auxiliary passage 220.

A loading operation, in which the banknotes in the loading box 170 enter the identification mechanism 130 sequentially through the loading passage 171, the auxiliary passage 220, and the main passage 210. The banknotes identified as qualified by the identification mechanism 130 enter the circulating box 150 sequentially through the main passage 210 and the circulating passage 151; the banknotes identified as unqualified by the identification mechanism 130 enter the recycling box 160 sequentially through the main passage 210, the auxiliary passage 220, and the recycling passage 161. And the banknotes move in the one-way direction along the preset direction in the auxiliary passage 220.

A loading and recycling operation, in which banknotes in the circulating box 150 enter the identification mechanism 130 sequentially through the circulating passage 151 and the main passage 210. The banknotes identified as qualified by the identification mechanism 130 enter the loading box 170 sequentially through the main passage 210, the auxiliary passage 220, and the loading passage 171; the banknotes identified as unqualified by the identification mechanism 130 enter the recycling box 160 sequentially through the main passage 210, the auxiliary passage 220, and the recycling passage 161. And the banknotes move in the one-way direction along the preset direction in the auxiliary passage 220.

A banknote withdrawal operation from the loading box 170, in which the banknotes in the loading box 170 enter the identification mechanism 130 sequentially through the loading passage 171, the auxiliary passage 220, and the main passage 210. The banknotes identified as qualified by the identification mechanism 130 enter the in-out mechanism 100 sequentially through the main passage 210 and the in-out passage 101; the banknotes identified as unqualified by the identification mechanism 130 enter the recycling box 160 sequentially through the main passage 210, the auxiliary passage 220, and the recycling passage 161. And the banknotes move in the one-way direction along the preset direction in the auxiliary passage 220.

An ignored banknotes recycling operation, in which the banknotes in the in-out mechanism 100 enter the identification mechanism 130 sequentially through the in-out passage 101 and the main passage 210. The banknotes passing through the identification mechanism 130 enter the recycling box 160 sequentially through the main passage 210, the auxiliary passage 220, and the recycling passage 161. And the banknotes move in the one-way direction along the preset direction in the auxiliary passage 220.

The banknote processing method will be described below, referring to FIG. 3 to FIG. 9.

In the banknote deposit operation, referring to FIG. 3 (the arrow and the thick solid line in the figure indicate the moving path of banknotes), when the user places the banknotes at the inlet 110, the corresponding switching member is controlled to communicate the first banknote incoming path 231 with the second banknote incoming path 232, and to communicate the second banknote incoming path 232 with the second path 212. The banknotes at the inlet 110 are delivered one by one into the first banknote incoming path 231, and after passing the second banknote incoming path 232 and the second path 212, the banknotes arrive at the identification mechanism 130 for identification, and the banknote identified by the identification mechanism 130 are delivered into the third passage 213. Depending on the identification result of the identification mechanism 130, when it is determined that the banknote is qualified, the corresponding switching member is controlled to communicate the third path 213 with the fourth path 214, and to communicate the fourth path 214 with the circulating passage 151 of the corresponding circulating box 150. The qualified banknotes enter the circulating box 150 for storage through the third path 213, the fourth path 214, and the corresponding circulating passage 151. The inlet 110 is opened widely so that banknotes that are to be deposited can be continuously added, making the banknote processing device 10 according to the present embodiment more suitable for depositing large amounts of banknotes. When the banknote is determined to be unqualified, the corresponding switching member is controlled to communicate the third path 213 with the second banknote outgoing path 242, and communicate the second banknote outgoing path 242 with the first banknote outgoing path 241, and the unqualified banknote is returned to the outlet 120 through the third path 213, the second banknote outgoing path 242, and the first banknote outgoing path 241, and is returned to the user.

In the banknote deposit cancelling operation, as shown in FIG. 4 (the arrow and the thick solid line in the figure indicate the moving path of the banknotes), when the user enters information for cancelling deposit transaction, the corresponding switching member is controlled to communicate the corresponding circulating passage 151 with the fourth path 214, communicate the fourth path 214 with the third path 213, to communicate the second path 212 with the second banknote incoming path 232, to communicate the second banknote incoming path 232 with the connecting path 250, and to communicate the connecting path 250 with the first banknote outgoing path 241. The banknote in the circulating box 150 is delivered to the identification mechanism 130 through the circulating passage 151, the fourth path 214, and the third path 213, then is delivered to the outlet 120 through the identification passage 131, the second path 212, the second banknote incoming path 232, the connecting path 250, and the first banknote outgoing path 241, and is returned to the user.

In the banknote withdrawal operation, as shown in FIG. 5 (the arrow and the thick solid line in the figure indicate the moving path of the banknote), when the user withdraws banknotes, the corresponding switching member is controlled to communicate the corresponding circulating passage 151 with the fourth path 214, and to communicate the fourth path 214 with the third path 213. The banknote is delivered into the fourth path 214 from the circulating box 150 through the corresponding circulating passage 151, and then is delivered to the identification mechanism 130 for identification through the third path 213. Depending on the identification result of the identification mechanism 130, when it is determined that the banknote is qualified, the corresponding switching member is controlled to communicate the second path 212 with the second banknote incoming path 232, to communicate the second banknote incoming path 232 with the connecting path 250, and to communicate the connecting path 250 with the first banknote outgoing path 241, and the banknote is delivered to the outlet 120 through the second path 212, the second banknote incoming path 232, the connecting path 250, and the first banknote outgoing path 241 to wait for the user to take away. And when it is determined that the banknote is unqualified, the corresponding switching member is controlled to communicate the second path 212 with the first path 211, to communicate the first path 211 with the third passage 223, and to communicate the second passage 222 with the recycling passage 161, and the banknote is delivered to the recycling box 160 through the second path 212, the first path 211, the third passage 223, the first passage 221, and the recycling passage 161 for storage.

In the loading operation, the term "loading" means that the banknotes in the loading box 170 are delivered into a preset circulating box 150, that is, the banknotes are replenished into the preset circulating box 150. The specific process is shown in FIG. 6 (the arrow and the thick solid line in the figure indicate the moving path of the banknotes), the corresponding switching member is controlled to communicate the loading passage 171 with the second passage 222, to communicate the second passage 222 with the first path 211 of the main passage 210, and to communicate the first path 211 with the second path 212. The banknote in the loading box 170 is delivered to the identification mechanism 130 through the loading passage 171, the second passage 222, the first path 211, and the second path 212 for identifying the currency type and the state of the banknote. According to the identification result of the identification mechanism 130, when it is determined that the banknote is qualified, the corresponding switching member is controlled to communicate the third path 213 with the fourth path 214, and the fourth path 214 is controlled to communicate with the corresponding circulating passage 151 depending on the currency type of the banknote, and the banknote is delivered to the corresponding circulating box 150 for storage through the third path 213, the fourth path 214, the corresponding circulating passage 151. The banknotes output from the loading box 170 are directly distributed to the corresponding circulating boxes 150 according to such loading process, and resulting in a high loading efficiency. When the banknote is determined to be unqualified, the corresponding switching member is controlled to communicate the first passage 221 with the recycling passage 161, and the banknote continues to move to the first passage 221 through the fourth path 214 and is delivered to the recycling box 160 for storage through the recycling passage 161. Since the first passage 221 is in communication with the fourth path 214, and in the first passage 221 the junction of the recycling passage 161 and the first passage 221 and the junction of the loading passage 171 and the first passage 221 are sequentially arranged along the first passage 221, the qualified banknotes are delivered to the corresponding circulating box 150 along the fourth path 214 and the unqualified banknotes are delivered to the first passage 221 through the fourth path 214 and are returned to the recycling box 160 through the recycling passage 161, while the loading box 170 continues to output the banknotes from the loading path 171 to the second passage 222. That is, during the banknote loading process, the banknotes are delivered from the loading passage 171 into the main passage 210 through the second passage 222 and then from the main passage 210 into the first passage 221, they are always moving in a single direction, so that three operations can be simultaneously performed including outputting banknotes from the loading box 170, conveying banknotes to the circulating box 150, and conveying banknotes to the recycling box 160, thereby improving the loading efficiency.

In the loading and recycling operation, the loading and recycling is to convey the banknotes from the circulating box 150 to the loading box 170. As shown in FIG. 7 (the arrow and the thick solid line in the figure indicate the moving path of the banknote), firstly, the corresponding switching member is controlled to communicate the circulating passage 151 corresponding to the set circulating box 150 with the fourth path 214, and to communicate the fourth path 214 with the third path 213. The banknote in the circulating box 150 is delivered to the identification mechanism 130 through the circulating path 151, the fourth path 214 and the third path 213. Depending on the identification result of the identification mechanism 130, when the banknote is determined to be qualified, the corresponding switching member is controlled to communicate the second path 212 with the first path 211, to communicate the first path 211 with the third passage 223, communicate the third passage 223 with the first passage 221, and to communicate the first passage 221 with the loading passage 171, and the banknote is delivered into the loading box 170 for storage along the second path 212, the first path 211, the third passage 223, the first passage 221 and the loading passage 171. When the banknote is determined to be unqualified, the corresponding switching member is controlled to communicate the first passage 221 with the recycling passage 161, and the banknote is delivered into the recycling box 160 for storage through the first passage 221 and the recycling passage 161. In the above-mentioned loading and recycling process, the loading and recycling efficiency is high because the banknotes move along the first passage 221 and sequentially enter the loading passage 171 or the recycling passage 161 that are in communication with the first passage 221. The banknote processing device 10 according to the present embodiment may also use the loading box 170 as the circulating box 150. That is, when the amount of the banknote in the circulating box 150 is less than a set value, the withdrawal from the circulating box 150 may be stopped and the banknote may be directly withdrawn from the loading box 170, thereby preventing shutdown issues caused by a small amount of banknotes in the circulating box 150, thereby improving the operating efficiency.

In the banknote withdrawal operation from the loading box, as shown in FIG. 8 (the arrow and the thick solid line in the figure indicate the moving path of banknotes), the corresponding switching member is controlled to communicate the loading passage 171 with the second passage 222, to communicate the second passage 222 with the first path 211, and to communicate the first path 211 with the second path 212. The banknotes in the loading box 170 enter the loading passage 171, the second passage 222, the first path 211, and the second path 212 and then are delivered to the identification mechanism 130, depending on the identification result of the identification mechanism 130, when the banknote is determined to be qualified, the corresponding switching member is controlled to communicate the third path 213 with the second banknote outgoing path 242, and to communicate the second banknote outgoing path 242 with the first banknote outgoing path 241, and the banknote is delivered to the outlet 120 through the third path 213, the second banknote outgoing path 242, and the first banknote outgoing path 241 awaiting the user to take it away; when the banknote is determined to be unqualified, the corresponding switching member is controlled to communicate the third path 213 with the fourth path 214, to communicate the fourth path 214 with the first passage 221, to communicate the first passage 221 with the recycling passage 161, and the banknote is delivered into the recycling box 160 for storage through the third path 213, the fourth path 214, the first passage 221 and the recycling passage 161.

In order to secure the user's rights and interests, the banknote processing device 10 may also recycle ignored banknotes into the recycling box 160 for storage.

In the ignored banknotes recycling operation, as shown in FIG. 9 (the arrow and the thick solid line in the figure indicate the moving path of banknotes), the corresponding switching member is controlled to communicate the first banknote outgoing path 241 with the second banknote outgoing path 242, to communicate the second banknote outgoing path 242 with the third path 213, to communicate the second path 212 with the first path 211, to communicate the first path 211 with the third passage 223, to communicate the third passage 223 with the first passage 221, and to communicate the first passage 221 with the recycling passage 161. The banknotes at the outlet 120 are delivered to the identification mechanism 130 through the first banknote outgoing path 241, the second banknote incoming path 232, and the third path 213, and after the banknote information is identified by the identification mechanism 130, the banknotes are delivered into the recycling box 160 for storage through the second path 212, the first path 211, the third passage 223, the first passage 221, and the recycling passage 161.

The banknotes move in a one way direction along a preset direction in the auxiliary passage 220 according to the banknote processing method provided by the present embodiment. In the banknote withdrawal operation, the banknotes do not pass through the junction of the loading passage 171 and the auxiliary passage 220. The banknote passes through the junction of the loading passage 171 and the auxiliary passage 220 only when performed the loading operation, the loading and recycling operation, and the banknote withdrawal operation from the loading box 170. Therefore, the probability of jamming in delivering the banknotes is reduced.

Figure 10:
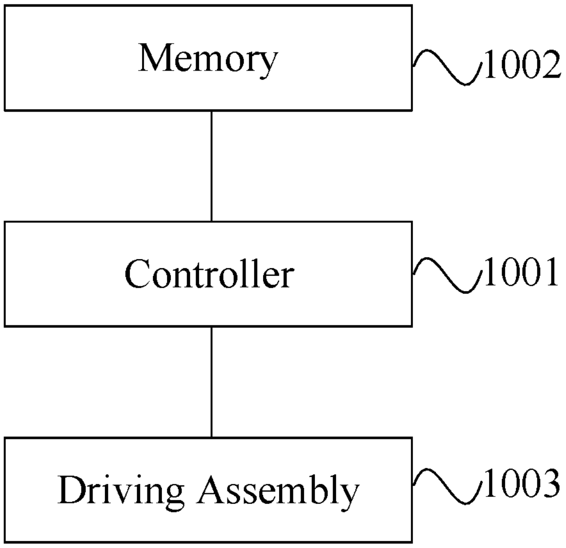
FIG. 10 is a block diagram illustrating a partial structural configuration of a banknote processing device according to an embodiment of the present disclosure.

FIG. 10 is a block diagram showing a part of the structure of the banknote processing device according to an embodiment and shows only a part of the structure of the banknote processing device. On the basis of the above-mentioned embodiment, the banknote processing device in the present embodiment may further include a controller 1001, a memory 1002, and a driving assembly 1003, and the controller 1001 is configured to control the device and the driving assembly 1003 in the above embodiment to perform a plurality of corresponding operations based on instructions stored in the memory 1002. The driving assembly 1003 may be configured to power a plurality of devices, such as the switching members in the above-mentioned embodiments. The memory 1002 may be a random access memory, a flash memory, or the like.

INDUSTRIAL APPLICABILITY

According to a banknote processing device provided by the present disclosure, banknotes move in the one-way direction along the present direction in an auxiliary passage. Therefore, in a banknote withdrawal operation, the banknotes do not pass through a junction between the loading passage and the auxiliary passage, reducing the probability of banknote jamming.

What is claimed is:

1. A banknote processing device, comprising: an identification mechanism, an in-out mechanism, a loading box, a circulating box, a main passage, an auxiliary passage, an in-out passage, a loading passage, and a circulating passage;
   - wherein the auxiliary passage is of an annular shape, and both ends of the main passage are connected to the auxiliary passage respectively, wherein a banknote is allowed to move in a one-way direction along a preset direction in the auxiliary passage;
   - the identification mechanism is arranged in the main passage;
   - the in-out passage is connected between the main passage and the in-out mechanism;
   - a first end of the circulating passage is connected to the main passage, and a second end of the circulating passage is in communication with the circulating box; and
   - a first end of the loading passage is connected to the auxiliary passage, and a second end of the loading passage is connected to the loading box;

wherein the auxiliary passage comprises a first passage, a second passage, and a third passage;

wherein the first passage, the second passage, and the third passage are annularly distributed;

wherein a first end of the first passage, a second end of the third passage, and a second end of the main passage intersect with each other;

wherein a second end of the first passage, a first end of the second passage, and the first end of the loading passage intersect with each other; and wherein a second end of the second passage, a first end of the third passage, and a first end of the main passage intersect with each other.

2. The banknote processing device of claim 1, further comprising a recycling passage and a recycling box;

wherein a first end of the recycling passage is connected to the auxiliary passage, and a second end of the recycling passage is connected to the recycling box.

3. The banknote processing device of claim 2, wherein a first end of the recycling passage is connected to the first passage.

4. The banknote processing device of claim 2, wherein a first switching member is arranged at an intersection of the first end of the loading passage, the first end of the second passage, and the second end of the first passage, and is configured to selectively communicate the first end of the loading passage with the second end of the first passage or with the first end of the second passage.

5. The banknote processing device of claim 4, wherein the first switching member is a bi-directional switching member.

6. The banknote processing device of claim 2, wherein a second switching member is arranged at an intersection of the second end of the second passage, the first end of the third passage, and the first end of the main passage, and is configured to selectively communicate the first end of the main passage with the second end of the second passage or with the first end of the third passage.

7. The banknote processing device of claim 6, wherein the second switching member is a bi-directional switching member.

8. The banknote processing device of claim 1, wherein the first end of the first passage is in communication with the second end of the third passage and with the second end of the main passage, and the second end of the third passage is not in communication with the second end of the main passage.

9. The banknote processing device of claim 1, wherein the in-out mechanism comprises an inlet and an outlet, wherein the in-out passage comprises a banknote incoming path and a banknote outgoing path, wherein the inlet is connected to the main passage through the banknote incoming path; and the outlet is connected to the main passage through the banknote outgoing path.

10. The banknote processing device of claim 9, wherein a junction of the banknote incoming path and the main passage is located between the first end of the main passage and the identification mechanism, and a junction of the banknote outgoing path and the main passage is located between the second end of the main passage and the identification mechanism.

11. The banknote processing device of claim 10, wherein the in-out passage further comprises a connecting path, wherein a first end of the connecting path is connected to the banknote incoming path, and a second end of the connecting path is connected to the banknote outgoing path.

12. A banknote processing method, implemented based on a banknote processing device, the banknote processing device comprising an identification mechanism, an in-out mechanism, a loading box, a circulating box, a main passage, an auxiliary passage, an in-out passage, a loading passage, and a circulating passage; wherein the auxiliary passage is of an annular shape, and both ends of the main passage are each connected to the auxiliary passage; wherein a banknote is allowed to move in a one-way direction along a preset direction in the auxiliary passage; wherein the identification mechanism is arranged in the main passage; wherein the in-out passage is connected between the main passage and the in-out mechanism; wherein a first end of the circulating passage is connected to the main passage, and a second end of the circulating passage is in communication with the circulating box; wherein a first end of the loading passage is connected to the auxiliary passage, and a second end of the loading passage is connected to the loading box; wherein the auxiliary passage comprises a first passage, a second passage, and a third passage; wherein the first passage, the second passage, and the third passage are annularly distributed; wherein a first end of the first passage, a second end of the third passage, and a second end of the main passage intersect with each other; wherein a second end of the first passage, a first end of the second passage, and the first end of the loading passage intersect with each other; and wherein a second end of the second passage, a first end of the third passage, and a first end of the main passage intersect with each other; the banknote processing method comprising at least one of the following operations:

a banknote deposit operation, in which banknotes are made to enter the main passage from the in-out mechanism through the in-out passage, and then enter the identification mechanism along the main passage; the banknotes identified as qualified by the identification mechanism are made to sequentially pass through the main passage and the circulating passage to enter the circulating box; and the banknotes identified as unqualified by the identification mechanism are made to sequentially pass through the main passage and the in-out passage to enter the in-out mechanism;

a banknote deposit cancelling operation, in which the banknotes are made to sequentially pass through the circulating passage and the main passage from the circulating box to enter the identification mechanism, and the banknotes that pass the identification mechanism are made to sequentially pass through the main passage and the in-out passage to enter the in-out mechanism;

a banknote withdrawal operation, in which banknotes sequentially pass through the circulating passage and the main passage from the circulating box to enter the identification mechanism; the banknotes identified as qualified by the identification mechanism are made to sequentially pass through the main passage and the in-out passage to enter the in-out mechanism, and the banknotes identified as unqualified by the identification mechanism are made to sequentially pass through the main passage, the auxiliary passage, and the recycling passage to enter the recycling box; wherein the banknotes are allowed to move in a one-way direction along a preset direction in the auxiliary passage;

a loading operation, in which banknotes in the loading box are made to sequentially pass through the loading passage, the auxiliary passage, and the main passage to enter the identification mechanism; the banknotes identified as qualified by the identification mechanism are made to sequentially pass through the main passage and the circulating passage to enter the circulating box, and the banknotes identified as unqualified by the identification mechanism are made to sequentially pass through the main passage, the auxiliary passage, and the recycling passage to enter the recycling box; wherein the banknote are allowed to move in a one-way direction along a preset direction in the auxiliary passage;

a loading and recycling operation, in which banknotes in the circulating box are made to sequentially pass through the circulating passage, and the main passage to enter the identification mechanism; the banknotes identified as qualified by the identification mechanism are made to sequentially pass through the main passage, the auxiliary passage, and the loading passage to enter the loading box, and the banknotes identified as unqualified by the identification mechanism are made to sequentially pass through the main passage, the auxiliary passage, and the recycling passage to enter the recycling box; wherein the banknote are allowed to move in a one-way direction along a preset direction in the auxiliary passage; and a banknote withdrawal operation from the loading box, in which the banknotes in the loading box are made to sequentially pass through the loading passage, the auxiliary passage, and the main passage to enter the identification mechanism; the banknotes identified as qualified by the identification mechanism are made to sequentially pass through the main passage and the in-out passage to enter the in-out mechanism, and the banknotes identified as unqualified by the identification mechanism are made to sequentially pass through the main passage, the auxiliary passage, and the recycling passage to enter the recycling box; wherein the banknotes are allowed to move in a one-way direction along a preset direction in the auxiliary passage; and an ignored banknotes recycling operation, in which the banknotes in the in-out mechanism are made to sequentially pass through the in-out passage and the main passage to enter the identification mechanism; the banknotes that pass through the identification mechanism are made to sequentially pass through the main passage, the auxiliary passage, and the recycling passage to enter the recycling box; wherein the banknotes are allowed to move in a one-way direction along a preset direction in the auxiliary passage.

13. The banknote processing method of claim 12, wherein the banknote processing device further comprises a recycling passage and a recycling box;

wherein a first end of the recycling passage is connected to the auxiliary passage, and a second end of the recycling passage is connected to the recycling box.

14. The banknote processing method of claim 13, wherein a first end of the recycling passage is connected to the first passage.

15. The banknote processing method of claim 13, wherein a first switching member is arranged at an intersection of the first end of the loading passage, the first end of the second passage, and the second end of the first passage, and is configured to selectively communicate the first end of the loading passage with the second end of the first passage or with the first end of the second passage.

16. The banknote processing method of claim 13, wherein a second switching member is arranged at an intersection of the second end of the second passage, the first end of the third passage, and the first end of the main passage, and is configured to selectively communicate the first end of the main passage with the second end of the second passage or with the first end of the third passage.

17. The banknote processing method of claim 12, wherein the first end of the first passage is in communication with the second end of the third passage and with the second end of the main passage, and the second end of the third passage is not in communication with the second end of the main passage.

18. The banknote processing method of claim 12, wherein the in-out mechanism comprises an inlet and an outlet, wherein the in-out passage comprises a banknote incoming path and a banknote outgoing path, wherein the inlet is connected to the main passage through the banknote incoming path; and the outlet is connected to the main passage through the banknote outgoing path.

* * * * *